(12) United States Patent
Danielsson (10) Patent No.: US 12,393,190 B2
(45) Date of Patent: Aug. 19, 2025

(54) METHOD AND SYSTEM FOR MONITORING COMMUNICATION BETWEEN VEHICLE AND REMOTE TERMINAL

(71) Applicant: Voysys AB, Norrköping (SE)

(72) Inventor: Torkel Danielsson, Linköping (SE)

(73) Assignee: Voysys AB, Norrköping (SE)

( * ) Notice: Subject to any disclaimer, the term of this patent is extended or adjusted under 35 U.S.C. 154(b) by 220 days.

(21) Appl. No.: 17/924,292

(22) PCT Filed: May 10, 2021

(86) PCT No.: PCT/EP2021/062324
§ 371 (c)(1),
(2) Date: Nov. 9, 2022

(87) PCT Pub. No.: WO2021/228765
PCT Pub. Date: Nov. 18, 2021

(65) Prior Publication Data
US 2023/0195108 A1    Jun. 22, 2023

(30) Foreign Application Priority Data
May 11, 2020   (EP) .................................... 20173902

(51) Int. Cl.
*G01C 21/32* (2006.01)
*G05D 1/00* (2024.01)
(Continued)

(52) U.S. Cl.
CPC ......... *G05D 1/0038* (2013.01); *G05D 1/0022* (2013.01); *G06K 7/1404* (2013.01); *H04N 7/18* (2013.01); *H04N 17/00* (2013.01)

(58) Field of Classification Search
CPC .. G05D 1/0038; G05D 1/0022; G06K 7/1404; H04N 7/18; H04N 17/00;
(Continued)

(56) References Cited

U.S. PATENT DOCUMENTS 10,158,927 B1 * 12/2018 Lei ........................ H04N 21/233
2005/0119801 A1   6/2005 Florentin et al.
(Continued)

FOREIGN PATENT DOCUMENTS

KR   2012-0112917 A  * 10/2012

OTHER PUBLICATIONS

KR20120112917A machine translation (Year: 2012).*
(Continued)

*Primary Examiner* — Anne Marie Antonucci
*Assistant Examiner* — Jingli Wang
(74) *Attorney, Agent, or Firm* — Kagan Binder, PLLC (57) ABSTRACT

This disclosure relates to a method (S0) for communicating information between a vehicle (20) and a remote terminal (10), the method comprising the steps of: providing (S1) at least one image frame (11) representing at least a portion of the vehicle's surrounding; wherein an encoded pattern (ENP1) representing predetermined information to be transmitted to the remote terminal (10) is visible on the at least one image frame (11); transmitting (S2) the at least one image frame from the vehicle (20) to the remote terminal (10); reading (S3), at the remote terminal (10), the encoded pattern (ENP2) visible on the at least one image frame (11); decoding (S4) the predetermined information from the encoded pattern (ENP2) read at the remote terminal. A system for carrying out the method is provided also.

14 Claims, 5 Drawing Sheets

(51) Int. Cl.
*G05D 1/02* (2020.01)
*G06K 7/14* (2006.01)
*H04N 7/18* (2006.01)
*H04N 17/00* (2006.01)
*G06N 3/04* (2023.01)
*G06N 3/08* (2023.01)

(58) Field of Classification Search
CPC ............ H04N 21/234; H04N 21/23892; H04L 67/12; H04W 4/44; H04W 12/106; H04W 12/65
See application file for complete search history.

(56) References Cited

U.S. PATENT DOCUMENTS

| | | | |
|---|---|---|---|
| 2015/0248131 A1 | 9/2015 | Fairfield et al. | |
| 2016/0291592 A1* | 10/2016 | Matthews | G06T 3/16 |
| 2018/0249084 A1* | 8/2018 | Lee | G04R 20/00 |
| 2020/0125117 A1 | 4/2020 | Switkes et al. | |
| 2020/0242942 A1* | 7/2020 | Gilbert | G08G 1/0125 |
| 2020/0269808 A1* | 8/2020 | Cho | H04L 9/0866 |
| 2020/0313890 A1* | 10/2020 | Mondello | H04L 9/3239 |
| 2021/0037495 A1* | 2/2021 | Pfadler | H04W 56/0065 |
| 2021/0211577 A1* | 7/2021 | Koravadi | B60R 1/23 |
| 2021/0245662 A1* | 8/2021 | Blank | B60R 11/0235 |
| 2022/0097522 A1* | 3/2022 | Jung | B60K 35/22 |

OTHER PUBLICATIONS

International Search Report and Written Opinion for International Application No. PCT/EP2021/062324, mailed Jun. 18, 2021, (13 pages).

* cited by examiner

METHOD AND SYSTEM FOR MONITORING COMMUNICATION BETWEEN VEHICLE AND REMOTE TERMINAL

CROSS-REFERENCE TO RELATED APPLICATIONS

This application claims priority to International Application No. PCT/EP2021/062324, filed May 10, 2021 and titled "METHOD AND SYSTEM FOR MONITORING COMMUNICATION BETWEEN VEHICLE AND REMOTE TERMINAL," which in turn claims priority from a European Patent Application having Ser. No. 20/173,902.6, filed May 11, 2020, both of which are incorporated herein by reference in their entireties.

TECHNICAL FIELD

The present disclosure relates to a method and system for monitoring communication between a vehicle and a remote terminal, and in particular methods and systems for monitoring communication and for communicating information in remote-operated vehicle systems.

BACKGROUND

In remote-operated vehicle systems, a vehicle is configured with sensors for capturing sensory data of the surroundings of the vehicle. The sensory data is then transmitted to a remote terminal at which a representation of said surroundings is constructed based on said sensory data. By means of the representation, the vehicle may be operated from the remote terminal, for instance by a human operator, to navigate its surroundings.

In order to provide an industrially applicable method and system for communicating information in remote-operated vehicle systems, certain aspects with regards to safety and security must be adequately solved. One particular aspect relates to the risk that the vehicle is operated based on inadequate representations of the vehicle's surroundings. Inadequate representations may for instance occur at the remote terminal when the image-to-image latency is too high resulting in vehicle operations too late in response to changes within the vehicle's surrounding. Inadequate representations may also occur if sensory data from the vehicle is not transmitted correctly, thus leading to erroneous representations of the vehicle's surrounding, or if the representation is somehow erroneously rendered at the remote terminal, or if the sensory data as captured is inadequate itself, for instance due to a malfunctioning sensor.

Some present inventions attempt to solve some of these issues by implementing communication systems with sufficient speed and redundancy. Such systems, however, may become very complex and expensive and may not address the risk of inadequate presentations of a vehicle's surrounding in a satisfactory manner, despite timely and correctly transmitted sensory data.

Thus, there is a need for an invention which at least improves upon present inventions in this regard, and in particular a system and method for reducing the risk that a representation displayed at a remote terminal is an inadequate representation of the vehicle's surrounding.

SUMMARY

It is an object of the present invention to provide an improved solution that alleviates at least some of the mentioned drawbacks with present solutions. Furthermore, it is an object to provide a method and system for communicating information between a vehicle and a remote terminal, in particular to provide an improved method and system with the object to reduce the risk that a representation displayed at the remote terminal is an inadequate representation of the vehicle's surrounding.

By inadequate representation of the vehicle surrounding, it may be meant that the constructed representation does not depict a sufficiently adequate representation of the vehicle surrounding so as to ensure safe vehicle operation.

The invention is defined by the appended independent claims, with embodiments being set forth in the appended dependent claims, in the following description and in the drawings.

According to a first aspect of the invention, a method for communicating information between a vehicle and a remote terminal is provided. The method comprises the steps of providing at least one image frame representing at least a portion of the vehicle and/or the vehicle's surrounding, wherein an encoded pattern representing predetermined information to be transmitted to the remote terminal is visible on the at least one image frame; transmitting said at least one image frame from the vehicle to the remote terminal; reading at the remote terminal, the encoded pattern visible on the at least one image frame, and decoding the predetermined information from the encoded pattern read at the remote terminal.

By transmitting predetermined information in this manner, i.e. as an encoded pattern visible on the at least one image frame, it may increase the probability that the image frame containing the encoded pattern is an adequate representation of at least a portion of the vehicle's surrounding. In particular, it may increase the probability that the at least one image frame has been correctly transmitted and rendered at the remote terminal. If decoded information does not correspond to the predetermined information which was to be transmitted to the remote terminal, or if the encoded pattern is partially or entirely missing, it may be deduced that an error has occurred either during the transmission of the at least one image frame or during the rendering of the at least one image frame. This enables a safer and more secure method for communicating information between a vehicle and a remote terminal, since it may prevent that the vehicle is operated based on at least partly inadequate representations of the vehicle surrounding as displayed at the remote terminal.

Information communicated between the vehicle and the remote terminal may be communicated via one or more communication links established between the vehicle and the remote terminal. Image frames provided with the encoded pattern may be compressed and sent as one or more packages in a bitstream to the remote terminal via the one or more communication links. Then, at the remote terminal, the one or more packages are unpackaged, and the data thereof is used for constructing a representation of the vehicle's surrounding. The communication links may be over separate communication networks, or over different links or channels in a common communications network. The communication links may be wireless communication links established over a cellular network, such as 4G/LTE or 5G.

By representation, it may be meant a video feed displayed on one screen at a remote terminal. It may also refer to a plurality of video feed portions displayed on separate screens at a remote terminal which together form a video feed. Thus, each video frame of the video feed may be based on a respective at least one image frame transmitted from the vehicle to the remote terminal. Each image frame may be associated to a specific time instance and a specific imaging sensor of the vehicle. By combining sensory data from a plurality of imaging sensors, a plurality of image frames for every time instance may be transmitted to the remote terminal and used in constructing the representation. The plurality of imaging sensors may be arranged so as to capture visual information in specific directions, for instance in a front view direction, a rear-view direction, in side view directions etc. The representation may also incorporate information from additional sensory data, such as sound information, distance measurement and vehicle data, or augmented features based on such information.

The predetermined information may be a random generated string of symbols. The predetermined information may be a string of symbols which change over time in a predictable manner. The predetermined information may change over time so that it changes for every time instance an image frame is captured. For instance, the vehicle imaging sensors may be configured to capture imaging frames 60 times per second of the vehicle surrounding. The predetermined information encoded onto each image frame as the encoded pattern may then change between each consecutive image frame. Moreover, the predetermined information may be unique for every time instance at which an image frame is captured. The change of predetermined information encoded to encoded patterns may be synchronized with the image capturing by the one or more vehicle imaging sensors, e.g. by using a synchronization signal shared by the vehicle imaging sensor(s) and the unit generating the predetermined information and/or the encoded pattern. By synchronizing the image capturing and the generation of the encoded pattern, it is ensured that no encoded pattern is viewed at the vehicle but not captured in any image frame and thereby not transmitted to the remote terminal.

The predetermined information may be encoded into an encoded pattern based on a predetermined encoding rule shared between the vehicle and the remote terminal. The encoded pattern may be any suitable pattern with sufficient complexity for encoding the predetermined information. The encoded pattern may be a string of symbols. The encoded pattern may be a sequence of elements which can be changed between different states. The encoded pattern may be visible at a general single location of each image frame, e.g. in a predetermined quadrant or corner of the image frame or along a predetermined image frame border of the image frame. The encoded pattern may comprise a plurality of portions visible at generally different locations of each image frame, e.g. in a predetermined quadrant, corner etc. of the image frame or along a predetermined image frame border of the image frame.

According to one embodiment, the predetermined information of the encoded pattern may include a timestamp of the at least one image frame. By having the predetermined information at least including a timestamp of the at least one image frame, it may be possible to determine if a specific image frame displayed is too old and adequate measurements may thereafter be taken. The age of an image frame, once determined after the predetermined information has been decoded, may be compared to an established theoretical or standard or average or mean image-to-image latency of the system. If the age of the image frame is determined to be outside a predetermined threshold limit of the image-to-image latency of the system, adequate actions may be taken, for instance, reducing the speed of the vehicle or stopping it entirely. The predetermined threshold limit may be set based on configuration of e.g. sensors, screens, communication units and communication network used. The threshold for an acceptable image-to-image latency may in one embodiment be between 80-250 ms. In another embodiment, the threshold may be between 100-200 ms.

According to one embodiment, the method may further comprise the step of transmitting sensory data including the at least one image frame from the vehicle to the remote terminal; and transmitting driving instructions from the remote terminal to the vehicle together with the decoded predetermined information and/or the read encoded pattern. The vehicle may be configured to only accept driving instructions with references to decoded predetermined information or to a read encoded pattern. By this, the vehicle may verify that driving instructions are in fact based on correct or at least adequate sensory data and may thus accept them. The encoded pattern may be decoded at the remote terminal to determine the predetermined pattern. In that case, the predetermined information decoded from the read encoded pattern may be transmitted together with the driving instructions. Alternatively, or additionally, the read encoded pattern may be transmitted together with the driving instructions. In that case, the encoded pattern may be decoded at the vehicle to determine whether the driving instructions are based on correct received information.

According to one embodiment, the method may further comprise the step of determining an image-to-image latency or a round-trip time between the vehicle and the remote terminal based on the decoded predetermined information of the at least one image frame. The predetermined information encoded on each image frame may include a timestamp of said image frame. Thus, when decoding the encoded pattern of the predetermined information, the timestamp of the image frame may be discerned and compared to the present time by which an image-to-image latency may be determined. The round-trip time may be determined at the vehicle. When receiving driving instructions from the remote terminal in reference to some decoded predetermined information including a timestamp of a transmitted image frame, the timestamp may be compared to the current time.

According to one embodiment, the method may further comprise the step of executing an emergency fail-safe procedure of the vehicle when the image-to-image latency or the round-trip time fails to satisfy a predetermined image-to-image latency condition or a predetermined round-trip time condition. By this, a safe vehicle operation may be ensured.

According to one embodiment, the method may further comprise the steps of generating a message authentication code based on the encoded pattern of at least one image frame and using the message authentication code to authenticate communication transmitted between the vehicle and the remote terminal. The vehicle and the remote terminal may share a message authentication code algorithm and a message authentication code key. The message authentication code key and the predetermined information encoded as an encoded pattern or the encoded pattern itself may be used as an input to the message authentication code algorithm so that a first message authentication code is generated. The message authentication code may be transmitted together with the image frame provided with the encoded pattern from the vehicle to the remote terminal. At the remote terminal, the predetermined information as decoded or the encoded pattern may be used together with the shared message authentication code key as input to the shared message authentication code algorithm by which a second message authentication code is generated. The first and second message authentication codes may then be compared to see if they are identical or not. The same procedure may be performed in the opposite direction, from the remote terminal to the vehicle. Thus, it may prevent relying on information communicated between the vehicle and remote terminal which have been tampered with, thus resulting in improved security.

According to one embodiment, the encoded pattern comprises a set of pattern elements configured so that each pattern element may be set to either of at least a first state and a second state. The number of pattern elements may be selected so as to achieve a sufficient complexity in predetermined information which can be encoded. Moreover, the pattern elements may be configured to be able to be set to a plurality of states, i.e. two or more than two, so as to increase complexity of the encoded pattern for any given number of pattern elements in the encoded pattern. For example, the number of pattern elements may be anything between 2 to 30 or more, and the number of states of each pattern element may be anything between 2 and 100 or more. Thus, the encoded pattern may encode predetermined information of great complexity.

According to one embodiment, the encoded pattern may be a color pattern, and the at least a first state and a second state of each pattern element may be of different colors. The colors may be predetermined and appropriately selected in view of the colors present in the image frame. The colors used in the encoded pattern may be selected so as to be easily discernible relative the background in image frames. The colors used may be "unnatural" colors, i.e. colors which do not commonly appearing in nature.

According to one embodiment, the encoded pattern may be generated by a light emitting device placed in the field of view of an imaging device of the vehicle configured to capture sensory data used for generating the at least one image frame. By this, the encoded pattern will be provided onto each image frame in an efficient manner. The encoded pattern need not be processed onto the images afterwards using software means. The light emitting device may be a display configured to provide the predetermined information as the encoded pattern. The display may be an LCD display, OLED display or any other suitable display comprising a set of pixels which can be adjusted in terms of brightness and color. The light emitting device may be configured to generate an encoded pattern of predetermined information every time instance where image frames of the vehicle's surrounding is captured. The light emitting device may be arranged inside the vehicle or outside the vehicle depending on where a particular imaging sensor is arranged. For example, if an imaging sensor is arranged inside the vehicle and aimed to capture image frames of a front view through the front window, the light emitting device may be arranged on or near the instrument board of the vehicle such that it is visible in the field of view of the imaging sensor.

According to one embodiment, the light emitting device comprises a plurality of light emitting diodes configured to provide pattern elements of the encoded pattern. The light emitting diodes may be of any color, for instance red, green, blue and/or white. The light emitting diodes may be organic light emitting diodes. The light emitting diodes may form an RGB set which together provide a pattern element. By this, the color of each pattern element may be adjusted.

According to one embodiment, the hue, brightness and/or saturation of available colors of each pattern element may be adjusted based on ambient light conditions of the vehicle. Different combinations of hue, brightness and/or saturation may form one or more states of each pattern element. The vehicle may be configured with an ambient light detector for monitoring the ambient light. The ambient light detector may be arranged to monitor the ambient light conditions in which the light emitting device must operate in to provide the encoded pattern. For example, in case of strong sunlight, the light emitting device may be adjusted so as to provide an encoded pattern visible in the image frames which is more easily discernable given the ambient light conditions. Moreover, the number of states of each pattern element may be adjusted based on ambient light conditions.

According to one embodiment, the encoded pattern may be read at the remote terminal by means of an encoded pattern detection device. The encoded pattern detection device may be one or more light sensor and/or color sensor. The encoded pattern detection device may further comprise a plurality of one-pixel cameras, each arranged to detect one pixel of the image displayed to the user, each such pixel displaying one pattern element. The sensor, sensors or cameras may be arranged directly on a screen on which the image frame is displayed to the user. By this, automatic reading of the encoded pattern may be enabled. The encoded pattern detection device may be configured to transmit detected encoded patterns to a decoding unit configured decode the detected encoded pattern. The decoding unit may be at the remote terminal, or at the vehicle. If the decoding unit is arranged at the vehicle, the encoded pattern detected by the encoded pattern detection device may be transmitted to the vehicle, either alone or together with e.g. driving instructions to the vehicle.

According to one embodiment, the encoded pattern may be embedded into the bitstream that transmits the at least one image frame using software instead of by means of a light emitting device. By this, the principle of the encoded pattern may still be used for an image frame. This may be advantageous in circumstances where a light emitting device may not easily be arranged in the field of view of an imaging sensor. According to one embodiment, the method comprises capturing image frames by means of different imaging sensors, wherein a light emitting device is arranged in the field of view of one imaging sensor to provide a visible encoding pattern while for image frames of a different imaging sensor, the encoded pattern is embedded into the bitstream that transmits that image frame using software.

According to one embodiment, the encoded pattern may be encrypted, and the encoded pattern is decrypted using an encryption key. By this, the predetermined information may not be easily determined by a third party other than the vehicle and the remote terminal. Moreover, it may hinder third parties from taking unauthorized control over the remote operated vehicle or transmit to the remote terminal. The decryption of the encrypted encoded pattern may be performed at the remote terminal. Alternatively, or additionally, the decryption may be performed at the vehicle after the transmitted encrypted encoded pattern has been read at the remote terminal and the read pattern has been transmitted back to the vehicle. In such embodiment, only the vehicle needs to know the encryption key and still be able to verify e.g. the image-to-image latency or the round-trip time.

According to a second aspect of the invention, a communications system is provided. The communications system may comprise a first system part for use in a vehicle. The communications system may comprise a second system part for use in a remote terminal. The first and second system part may be configured to enable the method for communicating information between the vehicle and the remote terminal according to the first aspect of the invention or any embodiments thereof.

The first system part may comprise one or more light emitting devices configured to be arranged in the field of view of one or more corresponding imaging sensors. The first system part may comprise said one or more corresponding imaging sensors. The first system part may comprise additional sensors for capturing additional sensory data of the vehicle's surrounding or the vehicle itself. The first system part may comprise a communications unit configured to communicate with a remote terminal. The first system part may comprise a processing device for packaging, compressing, and preparing the information to be communicated to the remote terminal. The processing device may likewise be configured to process information communicated to the vehicle from the remote terminal. The processing device may be configured to enable the disclosed method or any of its embodiments.

The second system part may comprise communications unit configured to communicate with the vehicle. The second system part may comprise a processing device configured to process the information communicated from the vehicle to the remote terminal. The second system part may be configured to transmit the information, including the at least one image frame to a display at the remote terminal for displaying said at least one image frame with the encoded pattern. The second system part may comprise an encoded pattern detection unit for detecting the encoded pattern. The detected encoded pattern may be transmitted to decoding unit to decode the encoded pattern.

According to a third aspect of the invention, a vehicle comprising the first system part according to the second aspect of the invention is provided. The vehicle may be an automated vehicle. The term "automated vehicle" may refer to any automated vehicles according to SAE Level 1 to SAE Level 5 of the SAE International published classification system with six levels—ranging from fully manual (SAE Level 0) to fully automated systems (SAE Level 5), known as J3016_201609, or Taxonomy and Definitions to On-Road Motor Vehicle Automated Driving Systems. Thus, by automated vehicle, it may refer to any such classified vehicles which are configured to be remote controlled from a remote terminal, for instance by a human operator, either all the time or momentarily.

According to a fourth aspect of the invention, a remote terminal comprising the second system part according to the second aspect of the invention is provided.

According to a fifth aspect of the invention, a vehicle system comprising one or more vehicles, at least one remote terminal and a communications system according to the second aspect of the invention.

Apart from image frames, the representation may be constructed based on additional sensory data representing additional information about the vehicle surroundings, such as sounds, range information, temperature, humidity etc. Moreover, in conjunction with image frames being transmitted between the vehicle and remote terminal as disclosed in the first or second aspect, the method and system may also transmit additional sensory data of the vehicle's surrounding and/or the vehicle itself. The sensory data may be visual information, sound distance information via for instance radar or laser, temperature, speed data, motor data etc.

Moreover, the representation may be rendered by means of a remote terminal VR headset connected to the remote terminal.

Moreover, the rendered representation may present a field of view in a driving direction of the vehicle having a horizontal field of view that extends between 90 degrees and 360 degrees and having a vertical field of view that extends between 45 degrees and 180 degrees.

Moreover, the displayed rendered representation may present augmented reality features for assisting a user operating the vehicle from the remote terminal. The augmented reality features may be based on information transmitted from the vehicle.

Moreover, the vehicle may be a land vehicle, such as a motor vehicle or a railed vehicle. The vehicle may further be a flying vehicle or a floating vehicle.

A plurality of embodiments and aspects of the invention have been briefly summarized. Although embodiments of the invention in certain cases are disclosed separate from each other, it should be understood that these embodiments may be claimed in various combinations, unless it is apparent that certain disclosed embodiments are mutually exclusive.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
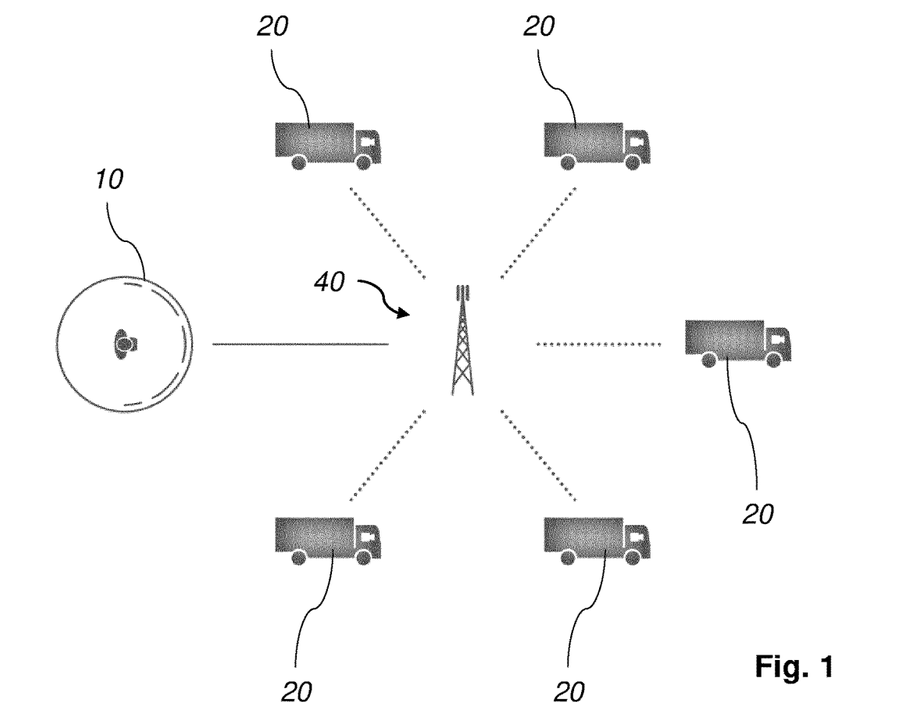
FIG. 1 shows a schematic view of a system according to an embodiment of the present invention.
Figure 2:
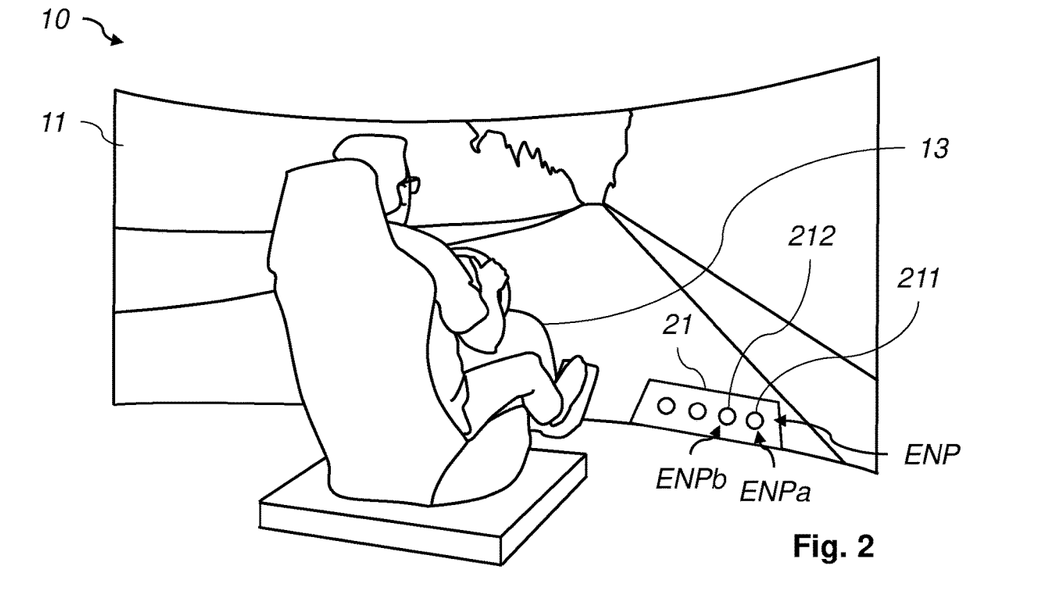
FIG. 2 shows a perspective view of a remote terminal according to an embodiment of the present invention.

FIG. 1 illustrates a system according to an embodiment of the present invention. A remote terminal 10 is communicatively connected to one or more vehicles 20 via a communications network 40. As seen in FIG. 2, the remote terminal 10 may comprise a display unit 11 and a control unit 13. On the display unit 11 image data, i.e. at least one image frame for every time instance captured, is displayed. The image data can be provided by one or more imaging sensors of the vehicle, which may be arranged to capture visual information in various directions relative the vehicle. In order to provide a wide image of the vehicle's surrounding, image data from a plurality of sensors may be combined. The image data may also comprise other sensory data, or be communicated along with other sensory data, that can be displayed to the user at the remote terminal 10. The other sensory data can be presented on top of the image data on the display unit 11 to provide an augmented reality view for the user. A user uses the control unit to generate information to be communicated to the vehicle 20, such as driving instructions. The driving instructions may include steering instructions, acceleration or braking instructions and similar. When receiving image data from the vehicle using a communication method as in the present invention, each image frame is provided with an encoded pattern ENP visible on said each image frame. As can be seen in FIG. 2 the encoded pattern ENP is provided by means of a light emitting device 21 arranged in the field of view of the one or more imaging devices by which the displayed image data is captured. The light emitting device 21 comprises a set of light emitting units 211, 212 which can be independently adjusted in terms of brightness and optionally color. The set of light emitting units 211, 212 are configured so as to provide the encoded pattern ENP in terms of pattern elements ENPa, ENPb. The encoded pattern ENP is read by an encoded pattern detection device and the detected encoded pattern is decoded by a decoding unit.

As see in FIG. 1, one remote terminal 10 can be in communication with several vehicles 20. The remote terminal 10 may then be used for monitoring the plurality of vehicles 20, and if necessary assume control of a specified vehicle 20.

Figure 3:
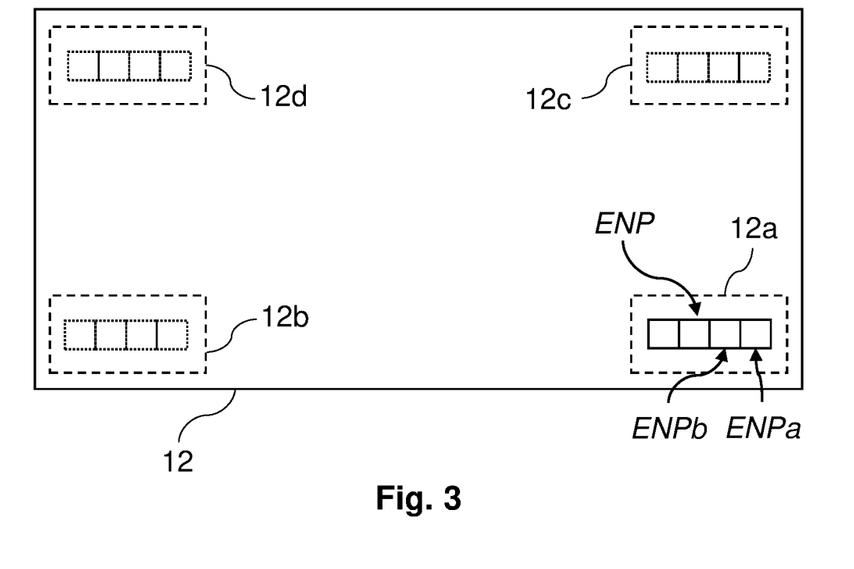
FIG. 3 shows an image frame with an encoded pattern as provided in a method according to an embodiment of the present invention.

FIG. 3 an image frame 12 with an encoded pattern ENP as provided in a method according to an embodiment of the present invention. The encoded pattern ENP may comprise of a plurality of pattern elements ENPa, ENPb which are arranged in some formation, for instance in series as shown in FIG. 3. Depending on the circumstances of the visual information to be represented as an image frame or of the imaging sensor providing said image frame, different positions within the image frame for the encoded pattern may be favorable. For instance, the encoded pattern may be provided at a single general location within the image frame 12, e.g. general location 12a towards the lower right corner. The encoded pattern may be provided in one of various general locations 12a, 12b, 12c, 12d within the image frame 12. The encoded pattern may be distributed over various general locations 12a, 12b, 12c, 12d within the image frame 12.

Figure 4:
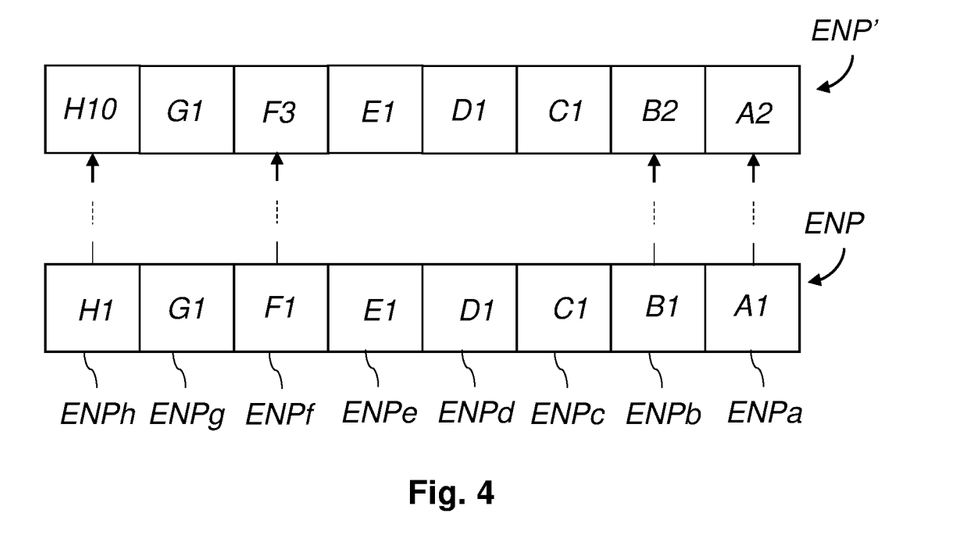
FIG. 4 shows an illustrative view of an encoded pattern according to an embodiment of the present invention.

FIG. 4 shows an illustrative view of an encoded pattern ENP, ENP' according to an embodiment of the present invention at two different time instances, wherein the first encoded pattern ENP is associated with a first time instance and the second encoded pattern ENP' is associated with a second time instance following the first time instance, for instance the next time instance at which imaging sensors are configured to capture the at least one image frame. The encoded pattern ENP, ENP' comprises a plurality of pattern elements ENPa-ENPh arranged in series. The encoded pattern ENP in FIG. 4 is shown to be comprised of eight pattern elements ENPa, ENPb, ENPc, ENPd, ENPe, ENPf, ENPg, ENPh but may of course comprise any suitable number of pattern elements. Moreover, each pattern element may be configured to be changed between a first state A1, B1, C1, D1, E1, F1, G1, H1 to at least a second state. In FIG. 4, pattern elements ENPa, ENPb change from a respective first state A1, B1 to a second state A2, B2, while pattern element ENPf and ENPh change from a first state F1, H1 to a corresponding third and tenth state F3, H10 respectively. The number of states may also be much more than the two, three or ten different states indicated in FIG. 4. The number of states may be configured to be individually different amongst the pattern elements and may be configured to be automatically adjusted depending on the ambient light conditions of the vehicle's surrounding or at the light emitting unit providing the encoded pattern. In one embodiment, the different states are represented by different combinations of colors, for instance RGB colors.

Figure 5:
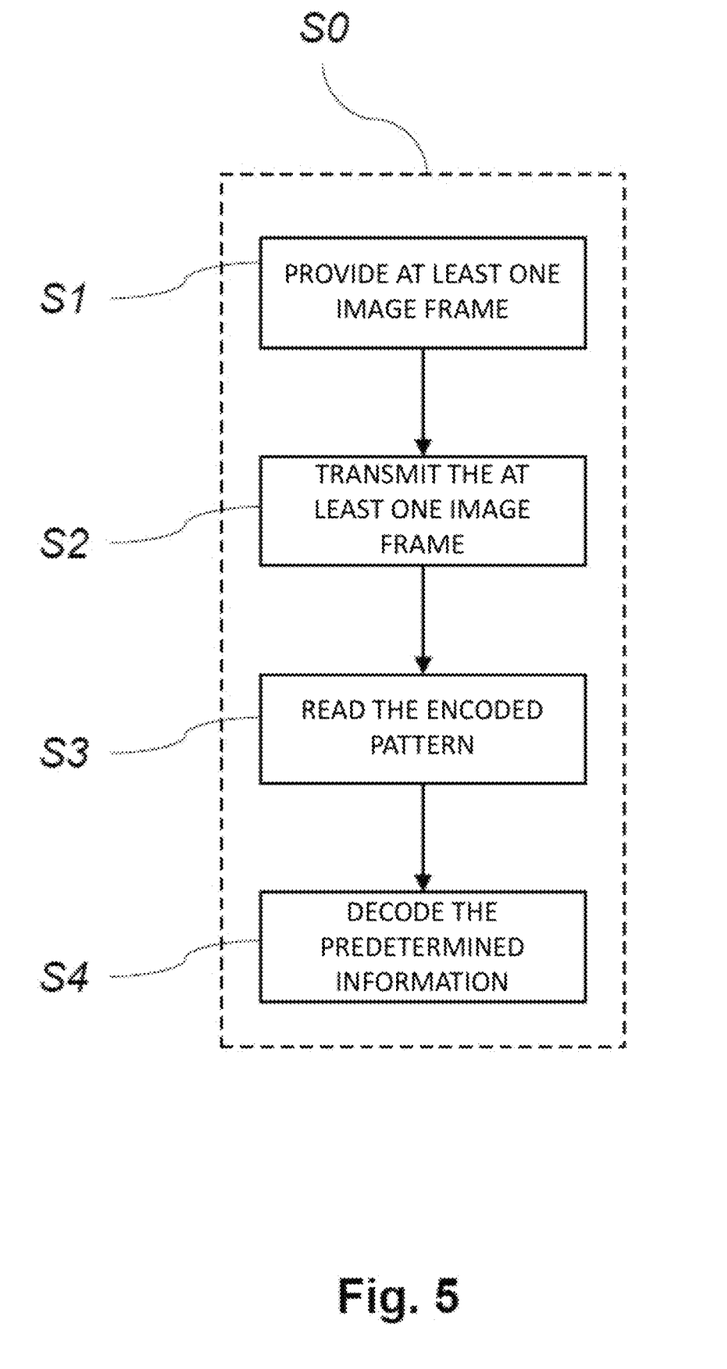
FIG. 5 shows a flow chart of a method according to an embodiment of the invention.

FIG. 5 shows a flow chart of a method according to an embodiment of the invention of communicating information between a vehicle 20 and a remote terminal 10. The method S0 comprises the step S1 of providing at least one image frame 11 representing at least a portion of the vehicle's surrounding. This step S1 of providing the at least one image frame is carried out by means of one or more imaging sensors configured to capture visual information about the vehicle's surrounding in the form of one or more image frame for every time instance. The at least one image frame 11 is provided so that an encoded pattern ENP1 is visible on the at least one image frame 11, which encoded pattern ENP1 represents predetermined information to be transmitted to the remote terminal. As mentioned previously, the encoded pattern may be provided by a light emitting device arranged in the field of view of the one or more imaging sensors, which light emitting device is configured to display the encoded pattern. In some embodiments, the encoded pattern is changed over time. For instance, the imaging sensors are configured to capture for every predetermined time instance at least one image frame 11. The method S0 further comprises the step S2 of transmitting the at least one image frame 11 from the vehicle 20 to the remote terminal 10. At the remote terminal, the at least one image frame 11 is displayed. The method S0 further comprises the step of reading S3, at the remote terminal 10, the encoded pattern ENP2 visible on the at least one image frame 11. The method S0 further comprises a step of decoding S4 the predetermined information from the encoded pattern read at the terminal. The decoding is performed either at the remote terminal 10 or in the vehicle 20 when the read encoded pattern has been transmitted back to the vehicle 20. In some embodiments, the predetermined information of the encoded pattern ENP1, ENP2, ENP3 includes a timestamp of the at least one image frame, or the predetermined information of the encoded pattern ENP1, ENP2 may be solely a timestamp of the at least one image frame indicating the time instance at which the at least one image frame was captured by the one or more imaging sensors. By communicating timestamps of each image frame in this manner, it also enables an image-to-image latency to be determined.

Figure 6:
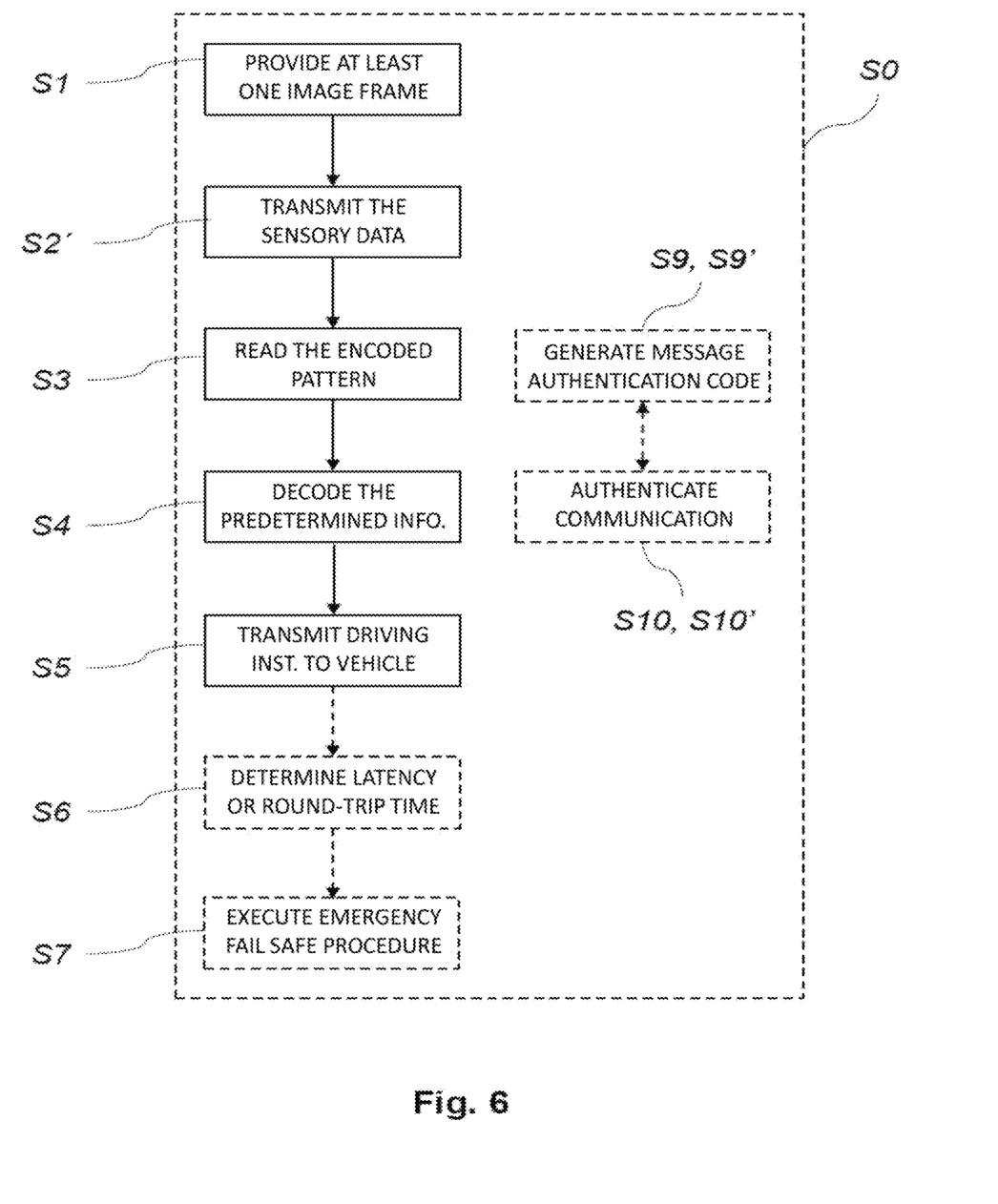
FIG. 6 shows a flow chart of a method according to an embodiment of the invention.

Moreover, more than just image frames may be communicated from the vehicle 20 to the remote terminal 10. As shown in FIG. 6, the method S0 comprises in some embodiments a step of transmitting S2' sensory data including the at least one image frame 11 from the vehicle 10 to the remote terminal 20. Based on this sensory data, a representation may be constructed and displayed at the remote terminal 10. An operator at the remote terminal 10 may thus issue driving instructions based on the transmitted sensory data, which is used to construct a representation at the remote terminal 10 and based on the decoded predetermined information. By means of a step S5, the driving instructions may be transmitted from the remote terminal 10 to the vehicle 20.

The vehicle 20 may then verify that driving instructions are accompanied with an encoded pattern representing transmitted predetermined information or the predetermined information directly, which predetermined are also corresponding to previously transmitted predetermined information. As shown in FIG. 6, the method S0 may comprise a step of determining S6 an image-to-image latency or a round-trip time between the vehicle 20 and the remote terminal. This may be based on the decoded predetermined information of the at least one image frame. The determined image-to-image latency or round-trip time may be compared to a maximally tolerable image-to-image latency or round-trip time predetermined based on specific requirements and the communication established between the vehicle 20 and the remote terminal 10. If the determined image-to-image latency or round-trip time fails to satisfy a predetermined image-to-image latency condition or a predetermined round-trip time condition, an emergency fail-safe procedure of the vehicle may be executed. This step of executing S7 an emergency fail-safe procedure of the vehicle is also shown in FIG. 6.

Figure 7:
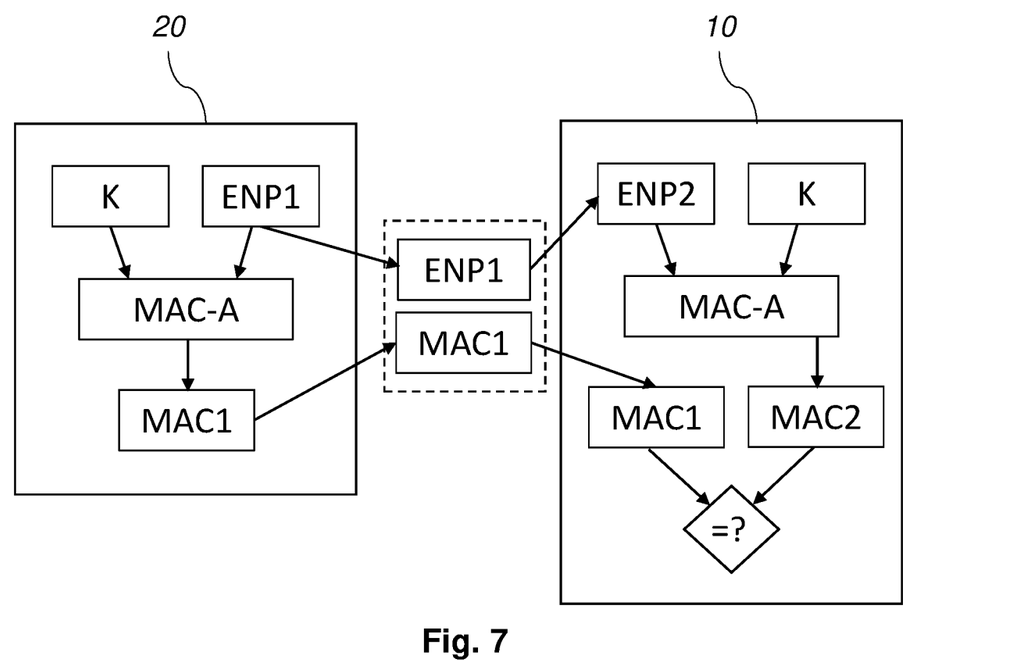
FIG. 7 shows a flow chart of a select collection of method steps according to an embodiment of the invention.
Figure 8:
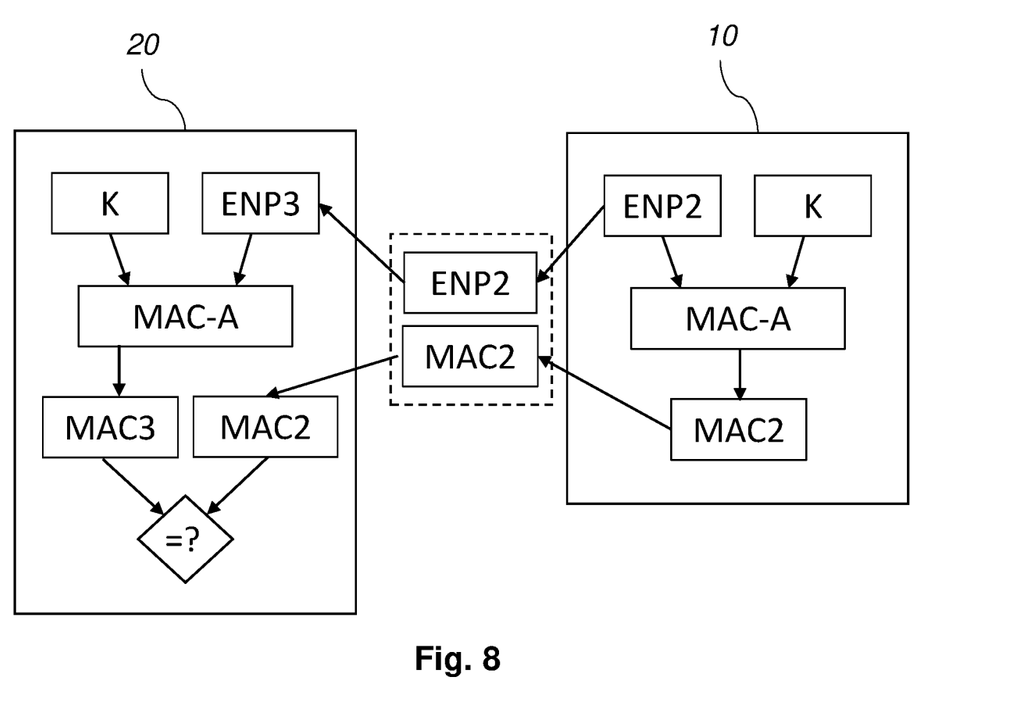
FIG. 8 shows a flow chart of a select collection of method steps according to an embodiment of the invention.

FIGS. 7 and 8 shows a flow chart of a select collection of method steps according to an embodiment of the invention, namely method steps S9, S9' and S10, S10' of the method S0 shown in FIG. 6. The encoded pattern ENP1, ENP2, ENP3 may be used to generate S9, S9' a message authentication code MAC1, MAC2, MAC3 which are used S10, S10' to authenticate communication transmitted between the vehicle 20 and the remote terminal 10. The different notations S9, S9', S10, S10' denote the direction of communication between the vehicle 20 and the remote terminal; steps S9, S10 refer to communication going from vehicle 20 to the remote terminal 10 and steps S9', S10' refer to communication going from remote terminal 10 to vehicle 20.

In each direction, authentication of communication is enabled by means of a shared message authentication code algorithm MAC-A and a shared message authentication code key K. At the vehicle 20, the original encoded pattern ENP1 in the at least one image frame 11 is used as an input together with the shared message authentication code key K to generate a first message authentication code MAC1. The first message authentication code MAC1 is then transmitted together with the sensory data including the at least one image frame 11 and the original encoded pattern ENP1. The information is received at the remote terminal 10 and the at least one image frame 11 is displayed and the transmitted encoded pattern ENP2 is read at the remote terminal. This transmitted encoded pattern ENP2 may be different due to an inadequate representation of the vehicle's surrounding. The transmitted encoded pattern ENP2 is used together with the shared message authentication code key K in the shared message authentication code algorithm MAC-A to generate a second message authentication code MAC2. Then the first and second message authentication codes MAC1, MAC2 are compared to see if they are identical or not. If not identical, it may be deduced that the at least one image frame may have been inadequately transmitted from the vehicle 20 to the remote terminal 10.

In the opposite direction, when for example driving instructions are to be sent to the vehicle, the second message authentication code MAC2 is transmitted together with the driving instructions including the transmitted encoded pattern ENP2 to the vehicle 20. The received encoded pattern ENP3 is then used together with the shared message authentication code key K in the shared message authentication code algorithm MAC-A to generate a third message authentication code MAC3 which is compared with the second message authentication code MAC2 to see if they are identical or not. If changed, the vehicle may be configured to refuse the driving instructions.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for communicating information between a vehicle and a remote terminal, the method comprising the steps of:
    providing at least one image frame representing at least a portion of the vehicle and/or the vehicle's surrounding by an imaging device arranged in or on the vehicle and configured to capture sensory data used for generating the at least one image frame, wherein an original encoded pattern representing predetermined information to be transmitted to the remote terminal, generated by a light emitting device in or on the vehicle placed in a field of view of the imaging device, is visible on the at least one image frame;
    transmitting the at least one image frame from the vehicle to the remote terminal, wherein the transmitted at least one image frame comprises a transmitted encoded pattern based on the original encoded pattern;
    reading, at the remote terminal, a received encoded pattern based on the transmitted encoded pattern visible on the at least one image frame;
    decoding the predetermined information from the received encoded pattern read at the remote terminal; and
    transmitting driving instructions for the vehicle from the remote terminal to the vehicle together with the decoded predetermined information and/or the received encoded pattern.

2. The method according to claim 1, wherein the predetermined information includes a timestamp of the at least one image frame.

3. The method according to claim 1, further comprising the step of:
    determining an image-to-image latency or a round-trip time between the vehicle and the remote terminal based on the decoded predetermined information of the at least one image frame.

4. The method according to claim 3, further comprising the step of:
    executing an emergency fail-safe procedure of the vehicle when the image-to-image latency or the round-trip time fails to satisfy a predetermined image-to-image latency condition or a predetermined round-trip time condition.

5. The method according to claim 1, further comprising the steps of:
    generating a message authentication code based on a respective original, transmitted, or received encoded pattern of at least one image frame, and
    using the generated message authentication code to authenticate communication transmitted between the vehicle and the remote terminal.

6. The method according to claim 1, wherein the original encoded pattern comprises a set of pattern elements configured so that each pattern element may be set to either of at least a first state and a second state.

7. The method according to claim 6, wherein the original encoded pattern comprises a color pattern, and the at least a first state and a second state of each pattern element are of different colors.

8. The method according to claim 6, wherein the light emitting device comprises a plurality of light emitting diodes configured to provide the set of pattern elements of the original encoded pattern.

9. The method according to claim 6, wherein a hue, brightness and/or saturation of available colors of each pattern element is adjusted based on ambient light conditions of the vehicle.

10. The method according to claim 1, wherein the received encoded pattern is read at the remote terminal by an encoded pattern detection device.

11. The method according to claim 1, wherein the received encoded pattern is encrypted, and the received encoded pattern is decrypted using an encryption key.

12. A communications system comprising a first system part for use in a vehicle and a second system part for use in a remote terminal, the first and second system parts configured to enable a method for communicating information between the vehicle and the remote terminal, wherein the method comprises the steps of:
providing at least one image frame representing at least a portion of the vehicle and/or the vehicle's surrounding by an imaging device arranged in or on the vehicle and configured to capture sensory data used for generating the at least one image frame, wherein an original encoded pattern representing predetermined information to be transmitted to the remote terminal, generated by a light emitting device in or on the vehicle placed in a field of view of the imaging device, is visible on the at least one image frame;
transmitting the at least one image frame from the vehicle to the remote terminal, wherein the transmitted at least one image frame comprises a transmitted encoded pattern based on the original encoded pattern;
reading, at the remote terminal, a received encoded pattern based on the transmitted encoded pattern visible on the at least one image frame;
decoding the predetermined information from the received encoded pattern read at the remote terminal; and
transmitting driving instructions for the vehicle from the remote terminal to the vehicle together with the decoded predetermined information and/or the received encoded pattern.

13. A vehicle system comprising one or more vehicles, at least one remote terminal, and a communications system comprising a first system part for use in a vehicle of the one or more vehicles and a second system part for use in a remote terminal of the at least one remote terminal, the first and second system parts configured to enable a method for communicating information between a vehicle and a remote terminal, wherein the method comprises the steps of:
providing at least one image frame representing at least a portion of the vehicle and/or the vehicle's surrounding by an imaging device arranged in or on the vehicle and configured to capture sensory data used for generating the at least one image frame, wherein an original encoded pattern representing predetermined information to be transmitted to the remote terminal, generated by a light emitting device in or on the vehicle placed in a field of view of the imaging device, is visible on the at least one image frame;
transmitting the at least one image frame from the vehicle to the remote terminal, wherein the transmitted at least one image frame comprises a transmitted encoded pattern based on the original encoded pattern;
reading, at the remote terminal, a received encoded pattern based on the transmitted encoded pattern visible on the at least one image frame;
decoding the predetermined information from the received encoded pattern read at the remote terminal; and
transmitting driving instructions for the vehicle from the remote terminal to the vehicle together with the decoded predetermined information and/or the received encoded pattern.

14. The method according to claim 7, wherein the light emitting device comprises a plurality of light emitting diodes configured provide the pattern elements of the original encoded pattern.

\* \* \* \* \*